(12) United States Patent
Gregoire et al.

(10) Patent No.: US 8,126,080 B2
(45) Date of Patent: Feb. 28, 2012

(54) HARDWARE IMPLEMENTATION OF SPACE-TIME BLOCK CODES

(75) Inventors: Jean-Philippe Gregoire, Jalhay (BE); Wouter De Win, Zaventem (BE); Nico Lugil, Rotselaar (BE)

(73) Assignee: Agient Technologies, Inc., Santa Clara, CA (US)

( * ) Notice: Subject to any disclaimer, the term of this patent is extended or adjusted under 35 U.S.C. 154(b) by 934 days.

(21) Appl. No.: 12/116,416

(22) Filed: May 7, 2008

(65) Prior Publication Data

US 2008/0292019 A1 Nov. 27, 2008

(30) Foreign Application Priority Data

May 22, 2007 (GB) .................................. 0709750.4

(51) Int. Cl.
*H04L 27/00* (2006.01)

(52) U.S. Cl. ........ 375/295; 375/216; 375/299; 375/347; 714/752; 714/755; 714/780

(58) Field of Classification Search .................. 375/295, 375/216, 299, 347; 714/752, 755, 780
See application file for complete search history.

(56) References Cited

U.S. PATENT DOCUMENTS

2003/0026348 A1 2/2003 Llang et al.
2005/0095997 A1 5/2005 Horng
2010/0086080 A1* 4/2010 Zhu et al. ...................... 375/298
2010/0220815 A1* 9/2010 Ho et al. ....................... 375/316

FOREIGN PATENT DOCUMENTS

EP 1679816 7/2006

OTHER PUBLICATIONS

Great Britain Search Report dated Aug. 30, 2007.

* cited by examiner

*Primary Examiner* — David C. Payne
*Assistant Examiner* — Zewdu Kassa

(57) ABSTRACT

The present invention is related to a circuit for encoding at least two input symbols by means of a space-time block code, comprising
 a plurality of multiplexers, each arranged to receive the input symbols and to output a selected symbol,
 storing means for storing information on which input symbol is to be selected in each multiplexer of the plurality of multiplexers and for storing gain factor information to multiply the multiplexer outputs with,
 calculation means, coupled with the storing means, for determining an encoded version of the input symbols based on the multiplexer outputs and corresponding gain factors stored in the storing means.
The invention further discloses a corresponding circuit for space-time block decoding.

10 Claims, 6 Drawing Sheets

US 8,126,080 B2

HARDWARE IMPLEMENTATION OF SPACE-TIME BLOCK CODES

This application claims priority from Great Britain Patent Application, No. GB 0709750β filed on 22 May 2007, which is incorporated by reference in its entirety.

FIELD OF THE INVENTION

The present invention relates to space-time block codes as used in wireless communication systems for increasing data transmission reliability.

STATE OF THE ART

Space-time coding (STC) is a method for improving the reliability of data transmission in wireless communication systems using multiple transmit antennas. STC techniques rely on transmitting multiple, redundant copies of a data stream to the receiver to make the communication system robust enough to overcome the effect of channel distortion without interfering with each other and to allow reliable decoding.

A practically important type of space-time coding is space-time block coding (STBC). Space Time Block Coding (STBC) is a technique that uses the space dimension to help improving the robustness of a wireless link. Space-time block codes act on a block of data symbols at once and provide only diversity gain, but are much less complex in implementation terms than Space-Time Trellis Codes. The input signal is coded and mapped to several 'spatial' streams. The spatial streams are further processed depending on the air interface used and finally are transmitted in the air using two or more antennas. FIG. 1 gives an illustration. A space-time block code can be defined with an MxN matrix, whereby the various entries are linear combinations of symbols contained in the input block and their conjugates. The number of transmit antennas in the system under consideration is N (with N≧2). M denotes the number of rows in the block code matrix and is also referred to as the block code length.

The STBC transmission scheme as presented by e.g. Alamouti ('A simple transmit diversity technique for wireless communications', IEEE Journal on Sel. Areas in Comm., vol. 16, no. 8, pp. 1451-1458, October 1998) and Tarokh ('Space-time block codes from orthogonal designs', IEEE Trans. Inform. Theory, vol. 45, pp. 1456-1467, July 1999) employs generalized orthogonal designs. Such designs use orthogonal code matrixes. In the following example the rows represent time and columns represent the various TX antennas. Hence, this code corresponds to the code $H_3$ presented by Tarokh in 'Space-Time Block Coding for Wireless Communications Performance Results' (IEEE Journal on Sel. Areas in Comm., vol. 17, no. 3, pp. 451-460, October 1998). The code rate is ¾ (i.e. a block of L=3 symbols input to the encoder block results in M=4 encoded symbols at the encoder block output) and the number of TX antennas N is 3.

$$\begin{pmatrix} x_1 & x_2 & \frac{x_3}{\sqrt{2}} \\ -x_2^* & x_1^* & \frac{x_3}{\sqrt{2}} \\ \frac{x_3^*}{\sqrt{2}} & \frac{x_3^*}{\sqrt{2}} & \frac{(-x_1 - x_1^* + x_2 - x_2^*)}{2} \\ \frac{x_3^*}{\sqrt{2}} & \frac{-x_3^*}{\sqrt{2}} & \frac{(x_2 + x_2^* + x_1 - x_1^*)}{2} \end{pmatrix} \quad (\text{eq. 1})$$

At the receiver side the signal is received on one or more receive antennas, processed and finally space-time block decoded. FIG. 2 illustrates a receiver scheme where space-time block decoding is applied. It is important to note that in STBC a single receive antenna is sufficient to decode the signal. The addition of more receive antennas leads to a performance improvement due to the array gain (non-coherent noise averaged between antennas, signal-to-noise ratio increasing).

AIMS OF THE INVENTION

The present invention aims to provide an efficient hardware implementation for encoding and decoding space-time block codes.

SUMMARY OF THE INVENTION

The present invention relates to a circuit for encoding at least two input symbols by means of a space-time block code, comprising
- a plurality of multiplexers, each arranged to receive the input symbols and to output a selected symbol,
- storing means for storing information on which input symbol is to be selected in each multiplexer of the plurality of multiplexers and for storing gain factor information to multiply the multiplexer outputs with,
- calculation means, coupled with the storing means, for determining an encoded version of the input symbols based on the multiplexer outputs and corresponding gain factors stored in the storing means.

Advantageously the storing means comprise first storing means for the information on which input symbol is to be selected, said first storing means being coupled with the plurality of multiplexers, and second storing means for the gain factor information.

Preferably the encoding circuit further comprises a buffer for receiving said at least two input symbols.

In a preferred embodiment the circuit further comprises a control element for controlling the storage means and, optionally, the buffer.

In an advantageous embodiment the input symbols are complex and separate buffers, multiplexers, storing means and calculation means are provided for encoding real and imaginary part.

In a second aspect the invention relates to a circuit for decoding space-time block codes, comprising
- storing means for storing an index submatrix and gain submatrix representation of the space-time block code with which the received symbols are coded,
- buffering means arranged to store channel estimation information and at least two received symbols, said buffering means further being arranged to receive information from the index submatrix in the storing means,
- calculation means, coupled with the storing means and with the buffering means, for calculating decoded symbols from data stored in the buffering means and corresponding gain factors from the gain submatrix in the storing means.

In an advantageous embodiment the storing means comprise first storing means for storing the index submatrix, said first storing means being coupled with the buffering means, and second storing means for storing the gain submatrix, said second storing means being coupled with the first storing means.

In another embodiment the calculation means comprises accumulation means arranged for accumulating intermediate calculation results.

Just as for the encoding circuit, the symbols received in the decoding circuit may be complex and separate buffering means, storing means and calculation means are provided for decoding real and imaginary part.

In a third aspect the invention relates to a method for space-time block encoding at least two input symbols, comprising the steps of
   storing an index submatrix and a gain submatrix representing the space-time block code to be used,
   applying the input symbols to a plurality of multiplexers,
   selecting in each multiplexer which symbol is to be output, based on information from the index submatrix,
   selecting for each multiplexer a gain factor corresponding to the symbol output by that multiplexer from the gain submatrix,
   calculating the encoded output symbol by combining the gain factors and the multiplexer outputs.

In a preferred embodiment the method for space-time block encoding further comprises a step of storing the input symbols in a buffer before applying them to the plurality of multiplexers.

In a further aspect the invention relates to a method for decoding received space-time block encoded symbols, comprising the steps of
   storing an index submatrix and a gain submatrix representing the space-time block code to be used,
   storing channel estimation information,
   taking a block with a number of said received symbols equal to the applied code block length,
   decoding said block of received symbols by means of channel estimation information, said index submatrix and said gain submatrix.

SHORT DESCRIPTION OF THE DRAWINGS

DETAILED DESCRIPTION OF THE INVENTION

The present invention offers an efficient implementation scheme for coding/decoding of STBC codes. The theoretical background of coding/decoding is explained by Tarokh in 'Space-Time Block Coding for Wireless Communications: Performance Results' (*IEEE Journal on Sel. Areas in Comm.*, vol. 17, no. 3, pp. 451-460, October 1998).

The invention is explained below for complex codes. It is to be noted however that also real codes can be considered. The scheme applied in the invention is based on a representation of the matrix as in Eq. 1 by four separate matrixes, namely two for the real part and two for the imaginary part. To do so, one first has to split the matrix in its real and imaginary branches. This gives for the above example of Equation 1:

$$\text{Real part:} \begin{pmatrix} I_1 & I_2 & \frac{I_3}{\sqrt{2}} \\ -I_2 & I_1 & \frac{I_3}{\sqrt{2}} \\ \frac{I_3}{\sqrt{2}} & \frac{I_3}{\sqrt{2}} & -I_1 \\ \frac{I_3}{\sqrt{2}} & -\frac{I_3}{\sqrt{2}} & I_2 \end{pmatrix} \quad \text{(eq. 2A)}$$

and $$\text{Imaginary part:} \begin{pmatrix} Q_1 & Q_2 & \frac{Q_3}{\sqrt{2}} \\ Q_2 & -Q_1 & \frac{Q_3}{\sqrt{2}} \\ -\frac{Q_3}{\sqrt{2}} & -\frac{Q_3}{\sqrt{2}} & Q_2 \\ -\frac{Q_3}{\sqrt{2}} & \frac{Q_3}{\sqrt{2}} & Q_1 \end{pmatrix} \quad \text{(eq. 2B)}$$

Next each matrix is split into a 'gain' submatrix and an 'index' submatrix. This operation yields for the I branch $$\text{Gain submatrix (real part): TSG\_I} = \begin{pmatrix} 1 & 1 & \frac{1}{\sqrt{2}} \\ -1 & 1 & \frac{1}{\sqrt{2}} \\ \frac{1}{\sqrt{2}} & \frac{1}{\sqrt{2}} & -1 \\ \frac{1}{\sqrt{2}} & -\frac{1}{\sqrt{2}} & 1 \end{pmatrix} \quad \text{(eq. 3)}$$

The same can be done for the Q branch. Furthermore, this transformation is fully and unlimited scaleable for any number of spatial streams, output block size and code rate.

Figure 1:
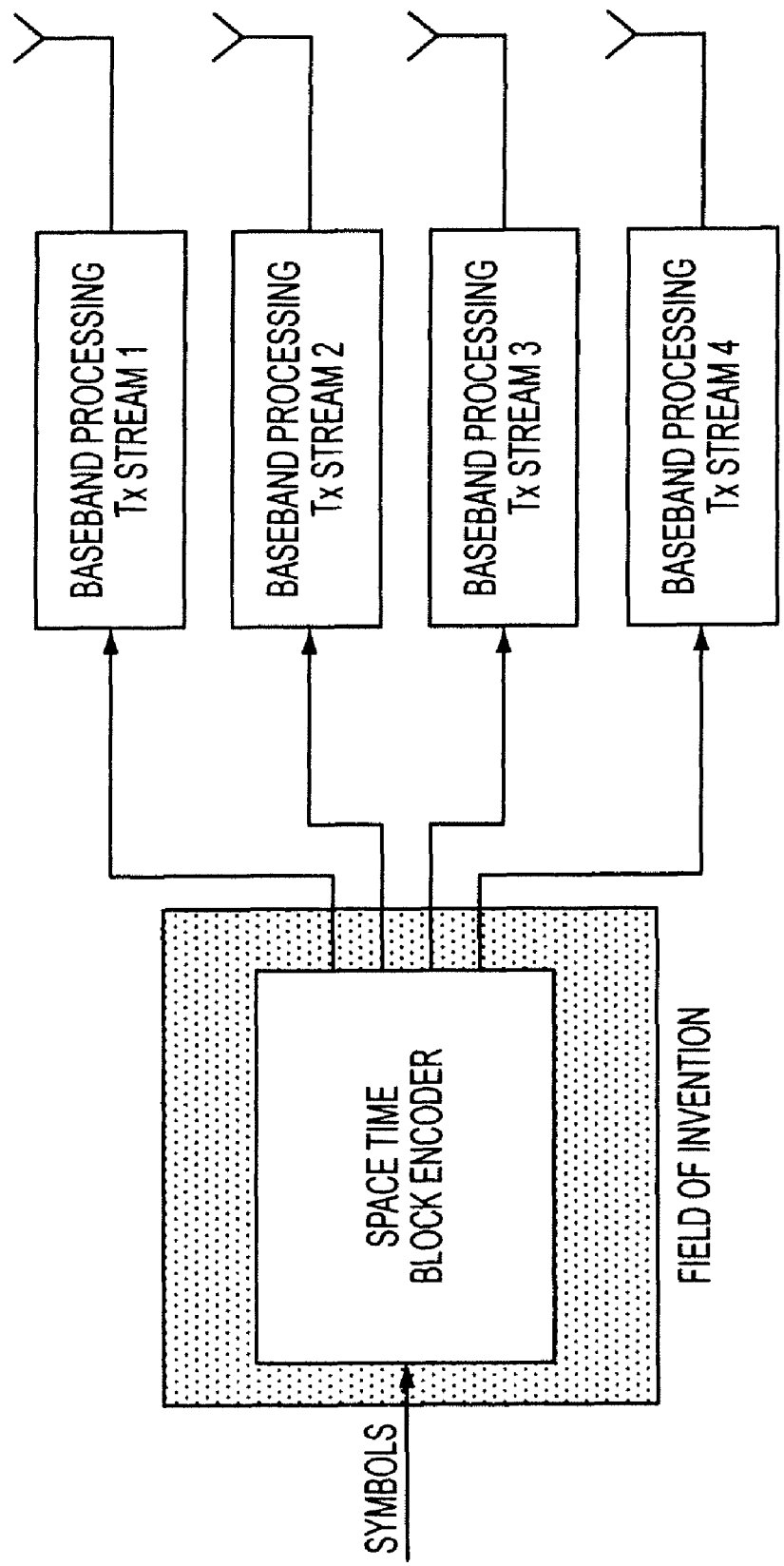
FIG. 1 represents a transmitter scheme wherein space-time block coding is applied.
Figure 2:
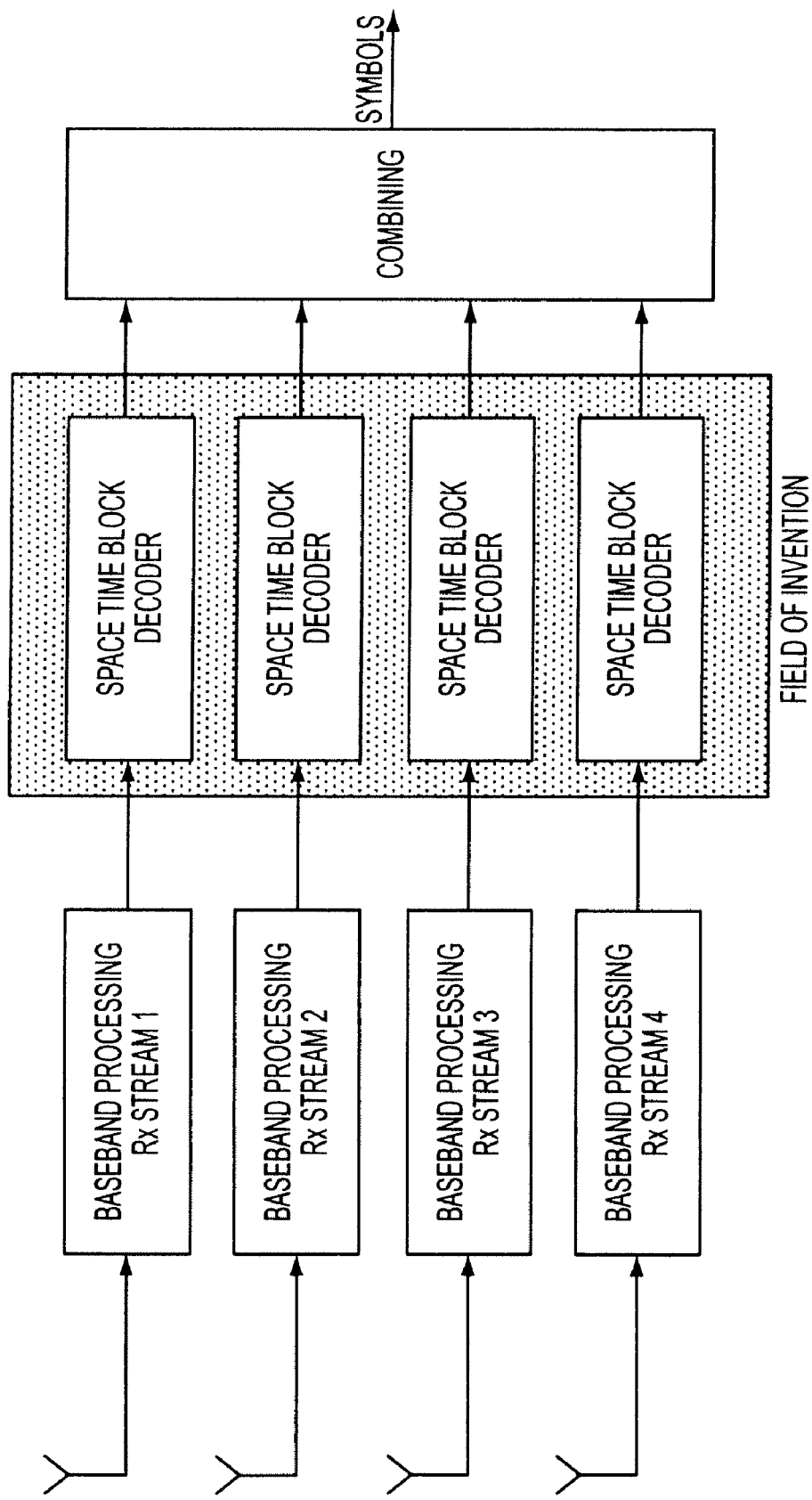
FIG. 2 represents a receiver scheme wherein space-time block coding is applied.
Figure 3:
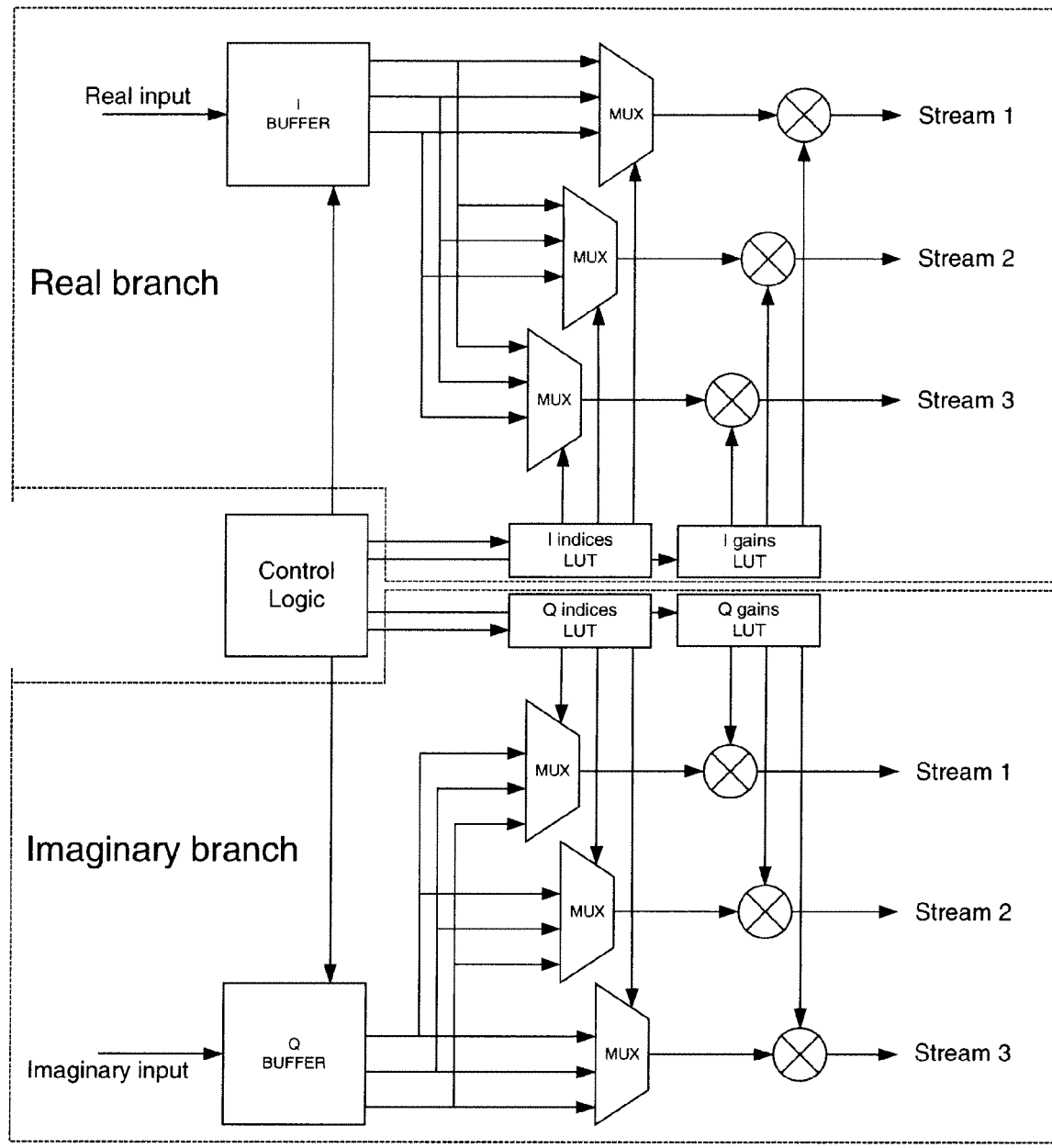
FIG. 3 represents a space-time block encoder architecture as in the present invention.
Figure 4:
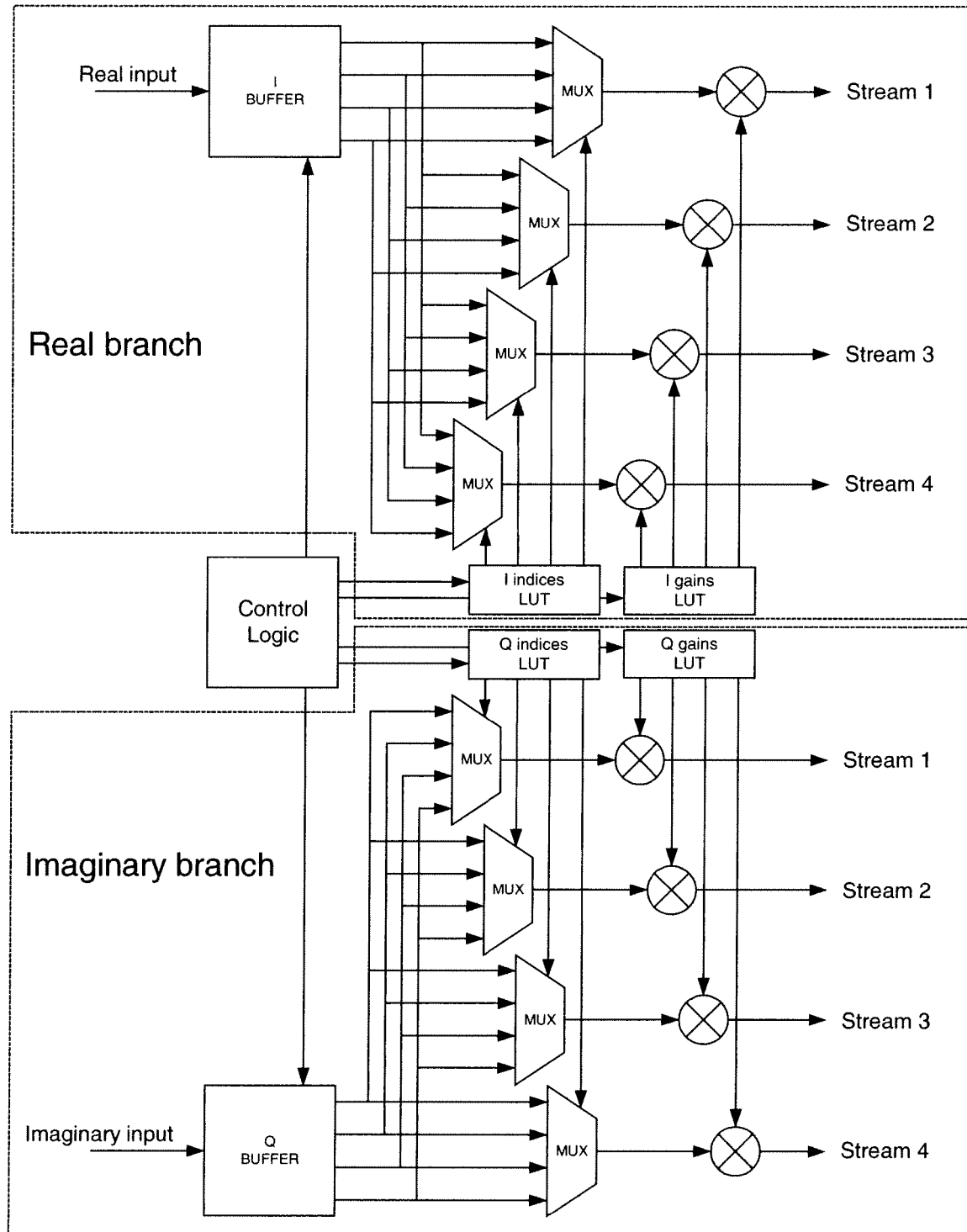
FIG. 4 represents a space-time block encoder architecture as in the present invention.

This specific representation of the space-time block codes allows for a highly simplified encoder architecture. The coding process (independent for I and Q) is simplified and can be implemented with simple multiplexers using inputs from the matrix Tind_I and an amplification with the gain stored in the matrix TSG_I. This remains valid for all the codes presented by Alamouti and Tarokh. An architecture suitable for implementation is proposed in FIG. 3. FIG. 3 shows an encoder scheme that could be used with the above-mentioned $H_3$ code. FIG. 4 shows as an additional example an encoder scheme suitable for a 4×4 code.

The scheme also simplifies the decoding process by reducing the hardware and computational power required. Due to the four matrices representation, the decoding rule is reduced to the following.

At each receiver antenna j the received data stream is cut in blocks of M values. The number of rows of Tind_I (i.e. the code block length, which also corresponds to the number of time symbols) is denoted by M, as already mentioned. Each value of the block is denoted $r_p$ which corresponds to a symbol in time (whereby p denotes a time index, for which holds $1 \leq p \leq M$).

The channel estimates are assumed constant over one space time coded block period. This assumption must be made in any standard using STBC, otherwise STBC could not work properly. Let $h_{i,j}$ represent the channel coefficient of the path between transmit antenna i and receive antenna j.

The decoder output is another block composed of L values, whereby L is the block length at the encoder input, i.e. the number of input symbols used to obtain an encoded STBC block. The ratio of the block length at the encoder input to that at the encoder output defines the code rate. The $k^{th}$ symbol at the STBC decoder output is called $x_k$. For the index k holds that $1 \leq k \leq L$, with L as defined above.

Next $x_k$ is calculated by computing the real and the imaginary part of $x_k$.

The real part can be calculated as follows. For each p ($1 \leq p \leq M$) it is checked if k appears in the $p^{th}$ row of Tind_I. If t denotes the $t^{th}$ column where k appears in the $p^{th}$ row, the following term is constructed:

$$\text{real}(ix_p) = Tsg\_I(p,t)*(\text{real}(h_{t,j})*\text{real}(r_p) + \text{imag}(h_{t,j})*\text{imag}(r_p))$$

If k does not appear in the $p^{th}$ row of Tind_I then real($ix_p$)=0. The various real ($ix_p$) are accumulated. The accumulated sum of real ($ix_p$) thus yields real ($x_k$).

The imaginary part imag($x_k$) can be computed as follows. For each p ($1 \leq p \leq n$) it is checked if k appears in the $p^{th}$ row of Tind_Q. If t denotes the $t^{th}$ column where k appears in the $p^{th}$ row, the following term is constructed:

$$\text{imag}(ix_p) = Tsg\_Q(p,t)*(\text{real}(h_{t,j})*\text{imag}(r_p) - \text{imag}(h_{t,j})*\text{real}(r_p))$$

If k does not appear in the $p^{th}$ row of Tind_Q then imag($ix_p$)=0.

The various imag($ix_p$) are accumulated. The accumulated sum of imag($ix_p$) thus yields imag($x_k$).

The calculation steps as set out above are repeated for each k, which finally yields a decoded version of the original block of data symbols. By decoding block after block in this way, the original stream of data symbols on each receive antenna can be decoded.

Example of the Decoding Process Using $H_3$

The example targets a system with one receiver antenna. The process can be generalized in a straightforward way for any number of receiver antennas by repeating the single receive antenna procedure. The output signals coming from the different decoders (one decoder per receive antenna) can be further combined using well known combining methods like maximum ratio combining for example. This combining step leads to a signal-to-noise ratio improvement, due to the array gain.

Figure 5:
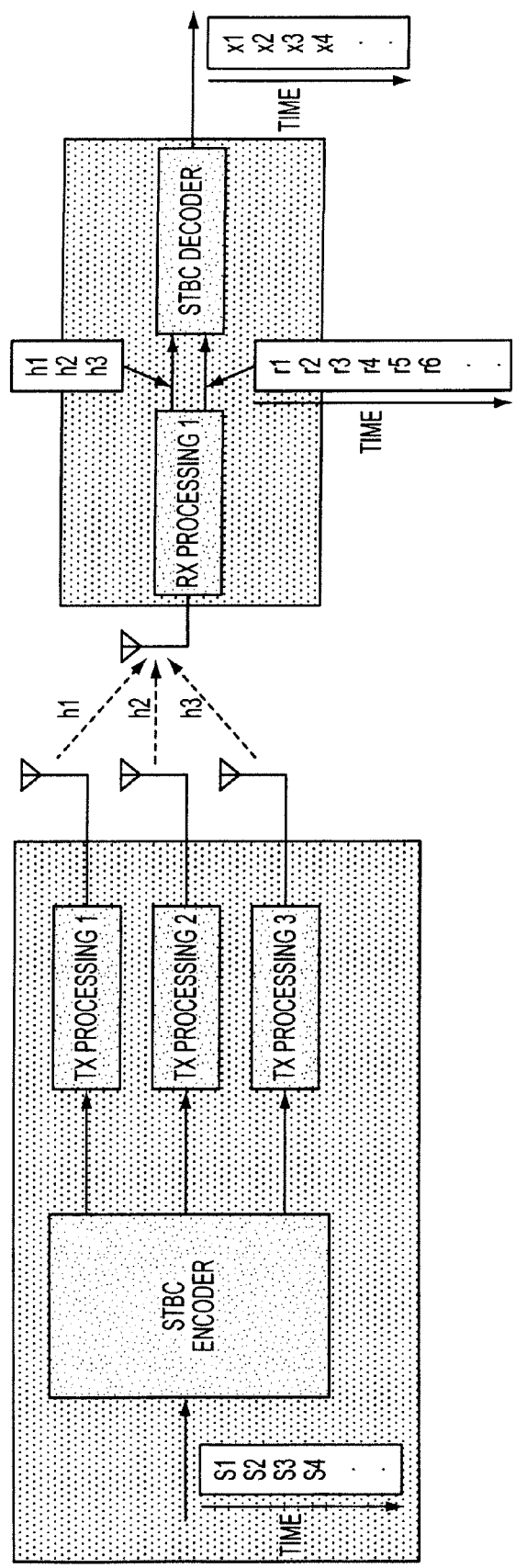
FIG. 5 represents the scheme discussed in the example of the decoding process.

The example is based on a 3×1 MISO (Multiple Input/Single Output) system, where matrix $H_3$ has been used at the transmitter (see FIG. 5).

The $H_3$ matrix is split into its real and imaginary components as in Equation 2. As already set out previously, the number of rows M in that representation is equal to the code block length and the number of columns N to the number of transmit antennas. From this the matrices Tsg_I and Tind_I of Eq. 3 can be derived in a straightforward way.

At the STBC decoder in the receiver, a signal is obtained that is denoted r (depicted by the [r1 r2 r3 . . . ] in FIG. 5). The channel coefficients are called h1 for TX antenna 1 to RX antenna 1, h2 for TX2 to RX1 and h3 for TX3 to RX1. The channel coefficients $h_{i,j}$ are assumed constant over one space time block.

In a first step the received vector r at the input of the STBC decoder is cut in blocks of the block code length M. For $H_3$, this length is 4 (the encoding process takes L=3 in and outputs M=4 symbols, which have to be decoded at the receiver side, thus decoding block length is 4). This is equal to the number of rows of the I and Q matrixes in equation 2.

In the following step each block is treated separately. In $H_3$ an encoded block has a length of 4. The data to be treated is the received (complex) symbols vector r at the input of the decoder. Each symbol is called $r_p$, p is a number comprised between 1 and the block length M, so between 1 and 4.

For this block, the channel estimation process (for a separate block) provides the channel coefficients vector [h1 h2 h3].

The decoder output is a block (vector) of a length equal to the input block length M times the block rate. In this example, that gives 4×¾=3. This block is called x and $x_k$ denotes the $k^{th}$ value (hence, k is a value between 1 and 3).

In the third step, for each k the following procedure is repeated:

1) The real part of $x_k$ is computed. The computation of $x_1$ is performed as follows. For p=1 to 4, the matrix Tind_I is scanned and the real(ixp) values are constructed. Row 1 of the matrix contains a 1. The position yields the value of t:t=1. Knowing p and t, the first real($ix_1$) can be constructed:

$$\text{real}(ix_1) = Tsg\_I(1,1)*(\text{real}(h_{1,j})*\text{real}(r_1) + \text{imag}(h_{1,j})*\text{imag}(r_1))$$

As there is only one RX antenna, j equals 1. Then the real($ix_1$) is accumulated:

$$acc\_r\_ixp = acc\_r\_ixp + \text{real}(ix_1).$$

Note that acc_r_ixp is reset for each value of k (after accumulation of p values).

For p=2 and 3, the same as p=1 is repeated as the $2^{nd}$ and $3^{rd}$ rows of Tind_I contain the value k. For p=4, the $4^{th}$ row does not contain k. t is set to 0 and Tsg_I gives a 0, resulting in real ($ix_4$)=0.

2) In a similar way the imaginary part of $x_k$ can be calculated

After step 3, one block is decoded and the next block decoding operation can start.

Figure 6:
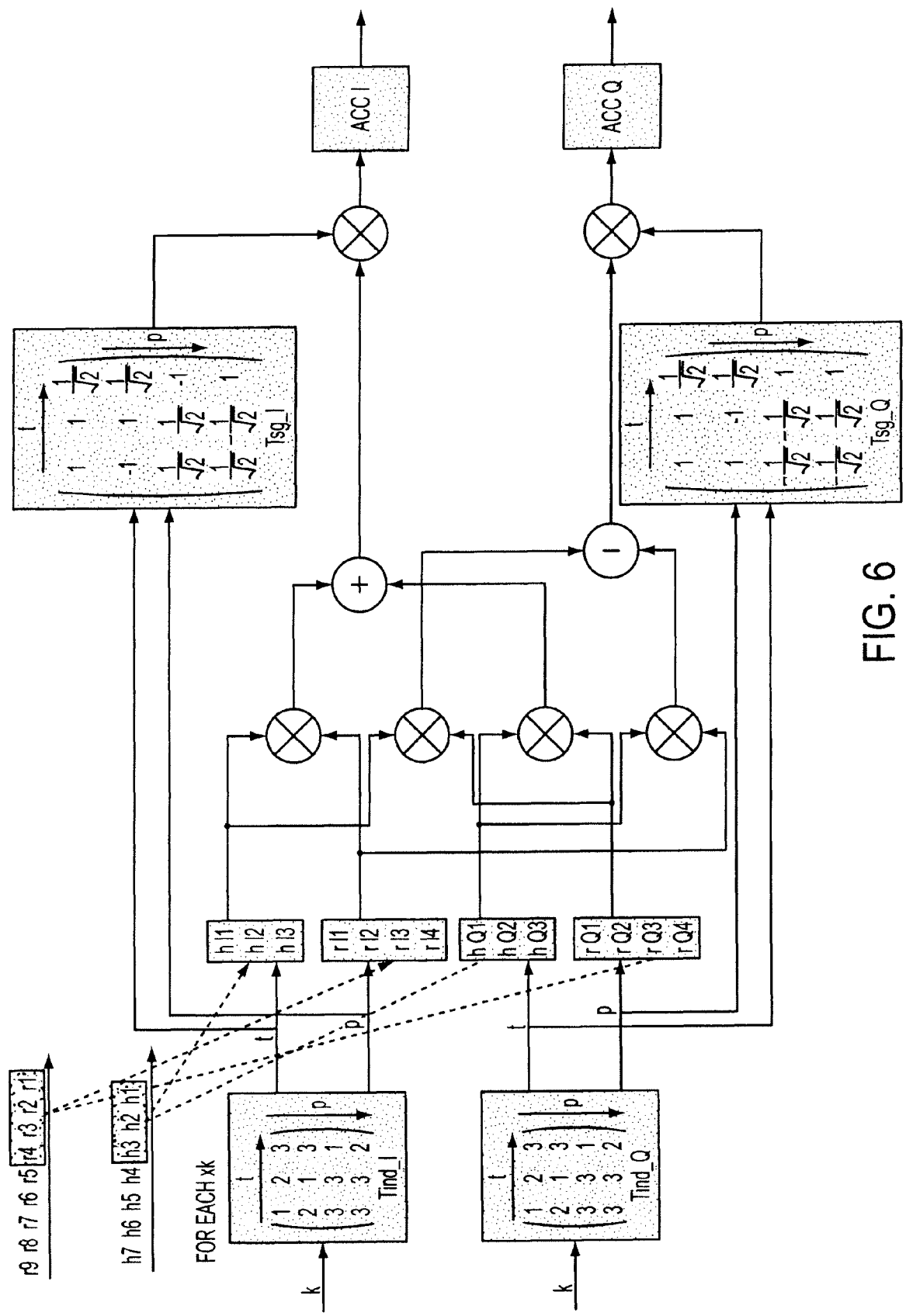
FIG. 6 represents a space-time block decoder architecture as in the present invention.

This way the decoding process can be very easily implemented in hardware. An example of implementation is given in FIG. 6.

Each block of received data R=[r1 . . . r4] is stored in a buffer. At the same time, the channel estimation vector H=[h1 h2 h3] is stored in a buffer. A counter generates k=1 to 3. For each k, another counter generates p=1 to 4. For each p, the block containing Tind_I(Q) outputs p and t, whereby t corresponds to the index (from 1 to 3) where k is found in row p. If k is not found, t=0. Parameters t and p are used as addresses for the two buffers containing the H and R vectors. t and p are also used as indexes in the array Tsg_I(Q). If t is 0, the output of the block containing Tsg_I(Q) is 0. The block Acc I(Q) accumulates the results of the multiplication of Tsg_I(Q) and (real ($h_{t,j}$)*real($r_p$)+imag($ht_j$)*imag($r_p$)) For Acc_Q (real ($h_{t,j}$)*imag($r_p$)−imag($h_{t,j}$)*real($r_p$)) is accumulated. The accumulation is reset after each k step. The accumulator outputs in each k step are the decoded data.

The process is valid and has been verified with all generalized complex orthogonal designs codes present in Tarokh and Alamouti papers.

The invention claimed is:

1. A circuit for encoding at least two input symbols by means of a space-time block code, comprising
a plurality of multiplexers, each arranged to receive said input symbols and to output a selected symbol,
storing means for storing information on which input symbol is to be selected in each multiplexer of said plurality of multiplexers and for storing gain factor information to multiply the multiplexer outputs with, and
calculation means, coupled with said storing means, for determining an encoded version of said input symbols based on said multiplexer outputs and corresponding gain factors stored in said storing means, wherein said storing means comprise first storing means for said information on which input symbol is to be selected, said first storing means being coupled with said plurality of multiplexers, and second storing means for said gain factor information.

2. The circuit for encoding as in claim 1, further comprising a buffer for receiving said at least two input symbols.

3. The circuit for encoding as in claim 1, further comprising a control element for controlling said storage means.

4. The circuit for encoding as in claim 1, wherein said input symbols are complex and wherein separate buffers, multiplexers, storing means and calculation means are provided for encoding real and imaginary part.

5. A circuit for decoding received space-time block coded symbols, comprising
   storing means for storing an index submatrix and gain submatrix representation of the space-time block code with which said received symbols are coded,
   buffering means arranged to store channel estimation information and at least two received symbols, said buffering means further being arranged to receive information from said index submatrix in said storing means, and
   calculation means, coupled with said storing means and with said buffering means, for calculating decoded symbols from data stored in said buffering means and corresponding gain factors from said gain submatrix in said storing means,
   wherein said storing means comprise first storing means for storing said index submatrix, said first storing means being coupled with the buffering means, and second storing means for storing said gain submatrix, said second storing means being coupled with said first storing means.

6. The circuit for decoding as in claim 5, wherein said calculation means comprises accumulation means arranged for accumulating intermediate calculation results.

7. The circuit for decoding as in claim 5, wherein said received symbols are complex and wherein separate buffering means, storing means and calculation means are provided for decoding real and imaginary part.

8. Method for space-time block encoding at least two input symbols, comprising:
   storing an index submatrix and a gain submatrix representing the space-time block code to be used,
   applying said input symbols to a plurality of multiplexers,
   selecting in each multiplexer which symbol is to be output, based on information from said index submatrix,
   selecting for each multiplexer a gain factor corresponding to the symbol output by that multiplexer from said gain submatrix, and calculating the encoded output symbol by combining said gain factors and said multiplexer outputs,
   the method further comprising storing said index submatrix in a first storing means and storing said gain submatrix in a second storing means, wherein said first storing means is coupled with said second storing means.

9. Method for space-time block encoding as in claim 8, further comprising storing said input symbols in a buffer before applying them to said plurality of multiplexers.

10. Method for decoding received space-time block encoded symbols, comprising:
   storing an index submatrix and a gain submatrix representing the space-time block code to be used within a buffer,
   storing channel estimation information within a buffer,
   taking a block with a number of said received symbols equal to the applied code block length, and
   decoding said block of received symbols by means of said channel estimation information, said index submatrix and said gain submatrix with a decoder,
   the method further comprising storing said index submatrix in a first storing means and storing said gain submatrix in a second storing means, wherein said first storing means is coupled with the buffer and with said second storing means.

\* \* \* \* \*

UNITED STATES PATENT AND TRADEMARK OFFICE
CERTIFICATE OF CORRECTION

PATENT NO. : 8,126,080 B2
APPLICATION NO. : 12/116416
DATED : February 28, 2012
INVENTOR(S) : Jean-Philippe Gregoire et al.

Page 1 of 1

It is certified that error appears in the above-identified patent and that said Letters Patent is hereby corrected as shown below:

On the Title page, in item (73), in "Assignee", in column 1, line 1, delete "Agient" and insert -- Agilent --, therefor.

In column 1, line 5, delete "0709750β" and insert -- 0709750.4 --, therefor.

Signed and Sealed this
Fifteenth Day of May, 2012

David J. Kappos
*Director of the United States Patent and Trademark Office*